US009898560B2

(12) United States Patent
Hinkley et al.

(10) Patent No.: US 9,898,560 B2
(45) Date of Patent: Feb. 20, 2018

(54) SYSTEM AND METHOD FOR FLEXIBLE AND EFFICIENT SIMULATION OF VARYING FRACTURE DENSITY IN A RESERVOIR SIMULATOR

(75) Inventors: Richard Edward Hinkley, Houston, TX (US); Qinghua Wang, Katy, TX (US); James William Watts, Houston, TX (US); Graham Christopher Fleming, Houston, TX (US); Dominic Camilleri, Houston, TX (US); Kefei Wang, Katy, TX (US); Wei David Liu, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 775 days.

(21) Appl. No.: 14/365,486

(22) PCT Filed: Dec. 16, 2011

(86) PCT No.: PCT/US2011/065599
§ 371 (c)(1),
(2), (4) Date: Jun. 13, 2014

(87) PCT Pub. No.: WO2013/089788
PCT Pub. Date: Jun. 20, 2013

(65) Prior Publication Data
US 2015/0006136 A1 Jan. 1, 2015

(51) Int. Cl.
*G06F 17/50* (2006.01)
*E21B 43/00* (2006.01)
(Continued)

(52) U.S. Cl.
CPC .......... *G06F 17/5009* (2013.01); *E21B 41/00* (2013.01); *E21B 43/00* (2013.01); *E21B 49/00* (2013.01); *G06F 2217/16* (2013.01)

(58) Field of Classification Search
CPC .. G06F 17/5009; G06F 2217/16; E21B 49/00; E21B 41/00; E21B 43/00
See application file for complete search history.

(56) References Cited

U.S. PATENT DOCUMENTS 6,842,725 B1 * 1/2005 Sarda ..................... G01V 11/00
702/11
2003/0216898 A1 11/2003 Basquet et al.
(Continued)

OTHER PUBLICATIONS

International Search Report and The Written Opinion of the International Searching Authority; dated Apr. 4, 2012; 11 pages; International Searching Authority, U.S.
(Continued)

*Primary Examiner* — Kamini S Shah
*Assistant Examiner* — Steven W Crabb
(74) *Attorney, Agent, or Firm* — Haynes and Boone, LLP

(57) ABSTRACT

Simulation system and method for a reservoir represented by a model having a plurality of matrix nodes, a plurality of fracture nodes, a fracture zone and a fracture-free zone are described. One embodiment includes computer-implemented steps of, for each of a plurality of matrix nodes in interconnected zones, characterizing the matrix nodes as dual matrix nodes or non-dual matrix nodes. Dual matrix nodes may be treated as a block and eliminated, after which the coefficient matrix and RHS vector for the model are updated. In-fill patterns between and among fracture nodes and non-dual matrix nodes resulting from the elimination are determined. For non-dual matrix nodes, the nodes are merged to a fracture grid, after which the coefficient matrix and RHS vector for the model are updated accordingly. The resultant linear system is linearly solved, and backsolving is performed for any eliminated dual matrix nodes.

29 Claims, 7 Drawing Sheets

(51) Int. Cl.
    *E21B 41/00*     (2006.01)
    *E21B 49/00*     (2006.01)

(56)           References Cited

U.S. PATENT DOCUMENTS

| | | |
|---|---|---|
| 2005/0256643 A1 | 11/2005 | Boitnott |
| 2006/0025976 A1 | 2/2006 | Kennon et al. |
| 2010/0082142 A1 | 4/2010 | Usadi et al. |
| 2010/0138196 A1* | 6/2010 | Hui ................ E21B 43/00 703/1 |
| 2010/0138202 A1 | 6/2010 | Mallison et al. |
| 2012/0136641 A1* | 5/2012 | Fung ................ E21B 43/00 703/10 |

OTHER PUBLICATIONS

International Preliminary Report on Patentability, dated Nov. 14, 2013, 10 pages, International Preliminary Examining Authority, U.S.

Fung et al.; "Numerical Simulation of Fractured Carbonate Reservoirs with the M_1 Bimodal Pore System;" *SPE Reservoir Simulation Symposium*; The Woodlands, Texas; Feb. 21-23, 2011.

Extended European Search Report for EP 11877583 dated May 20, 2016, 8 pages.

* cited by examiner

SYSTEM AND METHOD FOR FLEXIBLE AND EFFICIENT SIMULATION OF VARYING FRACTURE DENSITY IN A RESERVOIR SIMULATOR

CROSS-REFERENCE TO RELATED APPLICATION

This application is a U.S. National Stage application of PCT Application No. PCT/US2011/065599, filed on Dec. 16, 2011, having the same Title, also assigned to the assignee of the present application, and hereby incorporated by reference in its entirety.

BACKGROUND

Reservoir simulation is an area of reservoir engineering that employs computer models to predict the flow of fluids, such as petroleum, water, and gas, within a reservoir. Reservoir simulators are advantageously employed by petroleum producers in determining how best to develop new fields, as well as in connection with developed fields in generating production forecasts on which investment decisions are based.

Fractured reservoirs present special challenges for simulation because of the multiple porosity systems or structures that may be present in these types of reservoirs. Various types of dual-porosity formulations have evolved for modeling these types of reservoirs. Some formulations are appropriate for high fracture densities, while other formulations are more appropriate for low fracture densities. Usually fracture density is highly variable between zones of a reservoir or among different reservoirs undergoing simultaneous simulation. Fractured reservoirs are traditionally modeled by representing the porous media using two co-exiting pore volumes interconnected by flow networks. One type of pore system, referred to as matrix and defined with matrix nodes, is characterized by high pore volume and low conductivity. Another type of pore system, referred to as fractures defined with fracture nodes, is characterized by low pore volume and high conductivity.

Those of ordinary skill in the art will appreciate that "nodes" as used herein refer to an elemental representation of pore volume within a simulated reservoir, while "zones" refer to a collection of all the nodes within a portion of the simulated reservoir. Finally, "grid" or "subgrid" as used herein refers to a subset of the nodes within a zone. Unknowns such as pressures and composition are solved for, on a node by node basis, at desired time increments.

In one common prior art simulated representation of a reservoir, referred to as dual-porosity, single-permeability ("DPSP"), matrix nodes communicate only with fracture nodes. In DPSP, fracture nodes can also communicate with other fracture nodes. In another common simulated prior art representation of a reservoir, referred to as dual-porosity, dual-permeability ("DPDP"), matrix nodes communicate with both fracture nodes and other matrix nodes. Typically, in prior art simulated representations of a reservoir, the simulation characterizes the reservoir as either a DPSP or a DPDP and uses the characterization throughout the simulation process. These prior art techniques essentially treat fracture areas and fracture free areas the same by characterizing the formation as homogenous throughout, and thus, fail to accurately portray a reservoir.

Moreover, in some reservoirs, particularly carbonate reservoirs, a third type of pore system, referred to as "vugs," are prevalent. Vugs are pore spaces that are typically larger than pore spaces of the matrix. Vugs may or may not be connected to one another. Separate vugs are interconnected only through the interparticle porosity, i.e., the matrix porosity, and are not interconnected to one another as are matrix pore volumes and fracture pore volumes. As such, the fluid retention and transport properties of vug pore volumes are different from those of both the matrix and fractures. Thus, in addition to the drawback of characterizing dual porosity systems as either DPSP or DPDP, typically, dual-porosity formulations used in simulators of the prior art only account directly for fracture porosity and matrix porosity. The influence of vugs on liquid flow through a reservoir is represented indirectly and in a very approximate fashion, if at all.

What is needed is a flexible simulator framework that can more accurately accommodate varying fracture density pore volumes, namely, hybrid dual formulations, while maintaining optimal efficiency.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

In the detailed description of the embodiments, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

To overcome the above-noted and other limitations of the current approaches, one or more embodiments described herein comprise a reservoir simulator that can efficiently model heterogeneous formations having both dual-permeability, dual-porosity zones; dual-permeability, single-porosity zones; and missing fracture zones. The system utilizes a flexible data type to model fracture and non-fracture components of fluid volume and transport and employs a linear solver strategy, which can be applied by units of the data type instead of wholly one or the other.

Figure 1:
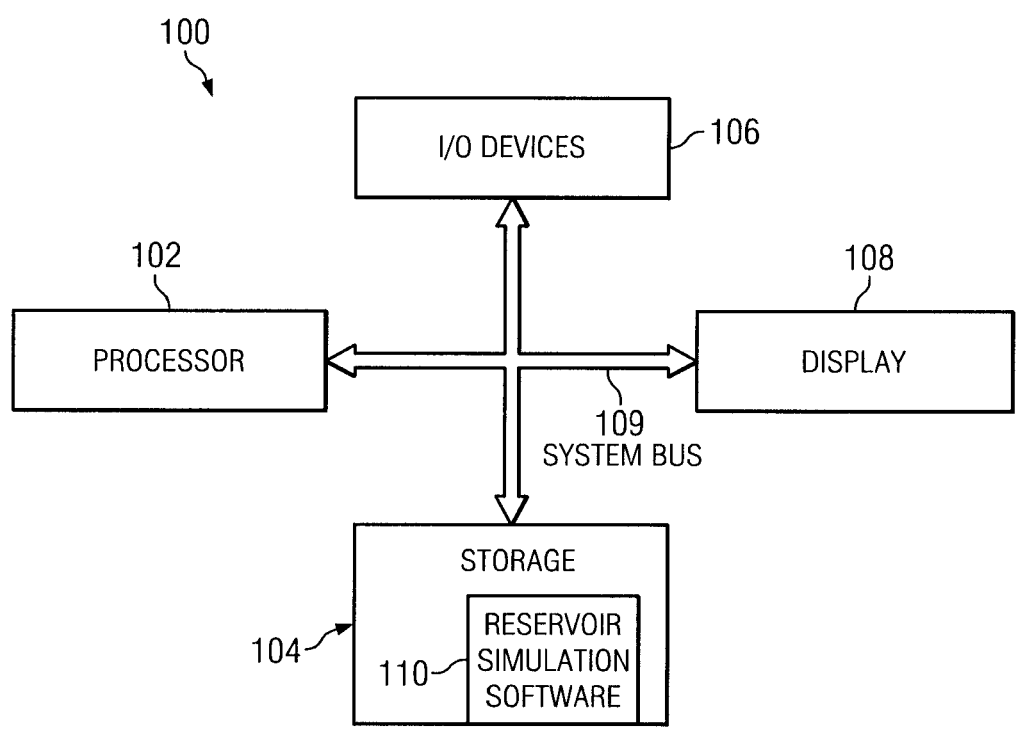
FIG. 1 is a block diagram of a computer system adapted for implementing a reservoir simulation system of exemplary embodiments.

FIG. 1 is a block diagram of an exemplary computer system 100 adapted for implementing a reservoir simulation system as described herein. In one embodiment, the computer system 100 includes at least one processor 102, storage 104, I/O devices 106, and a display 108 interconnected via a system bus 109. Software instructions executable by the processor 102 for implementing a reservoir simulation system 110 in accordance with the embodiments described herein, may be stored in storage 104. Although not explicitly shown in FIG. 1, it will be recognized that the computer system 100 may be connected to one or more public and/or private networks via appropriate network connections. It will also be recognized that the software instructions comprising the reservoir simulation system 110 may be loaded into storage 104 from a CD-ROM or other appropriate storage media.

In one embodiment, a portion of the reservoir simulation system 110 is implemented using reservoir simulation software. In this embodiment, a "subgrid" data type is used to offer a generalized formulation design. In one embodiment, this data type may be Fortran. Each subgrid defines the grid domain and interconnectivity properties of the nodes of a particular porosity structure. It also tracks various node variables, such as pressure, composition, fluid saturation, etc. Subgrids are designated as being of a particular porosity type, e.g., fracture, matrix, and vug. Subgrids of different porosity types occupying the same physical space are said to be "associated". Connections between porosity types are represented as external connections, subgrid to associated subgrids. Internal (or intragrid) connections represent flow connections within a porosity type.

Given the data design described above, the classic DPSP and DPDP formations can be modeled within the same reservoir domain. Areas of DPSP have associated subgrids where only the fracture subgrids have internal connections. Areas of DPDP have internal connections in both matrix and fracture porosity types.

As is described in greater detail below, another important aspect of the embodiments described herein is the linear solver design utilized with respect to multiple porosity models. The linear solver methodology is applied by subgrid or associated subgrids. In the case of DPSP, where there are no internal connections for the matrix nodes comprising a matrix subgrid, the solver performs a simple elimination of the matrix nodes with no connectivity to other matrix nodes prior to performing the full solution for the resulting fracture Jacobian. In the case of a DPDP pair of subgrids, in which internal connections between the nodes for both matrix and fracture porosity types exist, for efficiency purposes, the two subgrids are preferably merged prior to the full solution. For purposes of the description of the invention, a matrix node with matrix-to-matrix connectivity will be referred to as "non-dual" matrix node and a matrix node with matrix-to-fracture connectivity will be referred to as a "dual" matrix node.

As is described in greater detail below, yet another important aspect of the embodiments is that, in modeled formations in which fractures are present only in certain areas that are not easily characterized by a fracture subgrid or a matrix subgrid (because any resulting subgrid would have areas of missing fractures), a special pair of "associated" subgrids is created in which matrix-to-matrix connections exist in the areas in which there are no fractures, but otherwise, the subgrid is treated as a DPSP case, as described above. As will be described, the procedure performed by the linear solver is adjusted to what would otherwise be considered a DPDP case, because of the matrix-to-matrix connections. The linear solver merges the associated subgrids, performs elimination where possible, and then carries out a complete solution.

Those of ordinary skill in the art will appreciate that by modeling a reservoir utilizing both the classic DPSP and DPDP formations within the same reservoir domain (rather than simply modeling the formation as either DPSP or DPDP), the invention exploits the ability in DPSP simulations to eliminate matrix nodes with no connectivity to other matrix nodes, i.e., dual matrix nodes, thereby simplifying modeling of certain zones within the formation. Moreover, by utilizing both DPSP and DPDP where appropriate, the invention eliminates the prior art need to select only one DPSP or DPDP for the simulation.

Figure 2A:
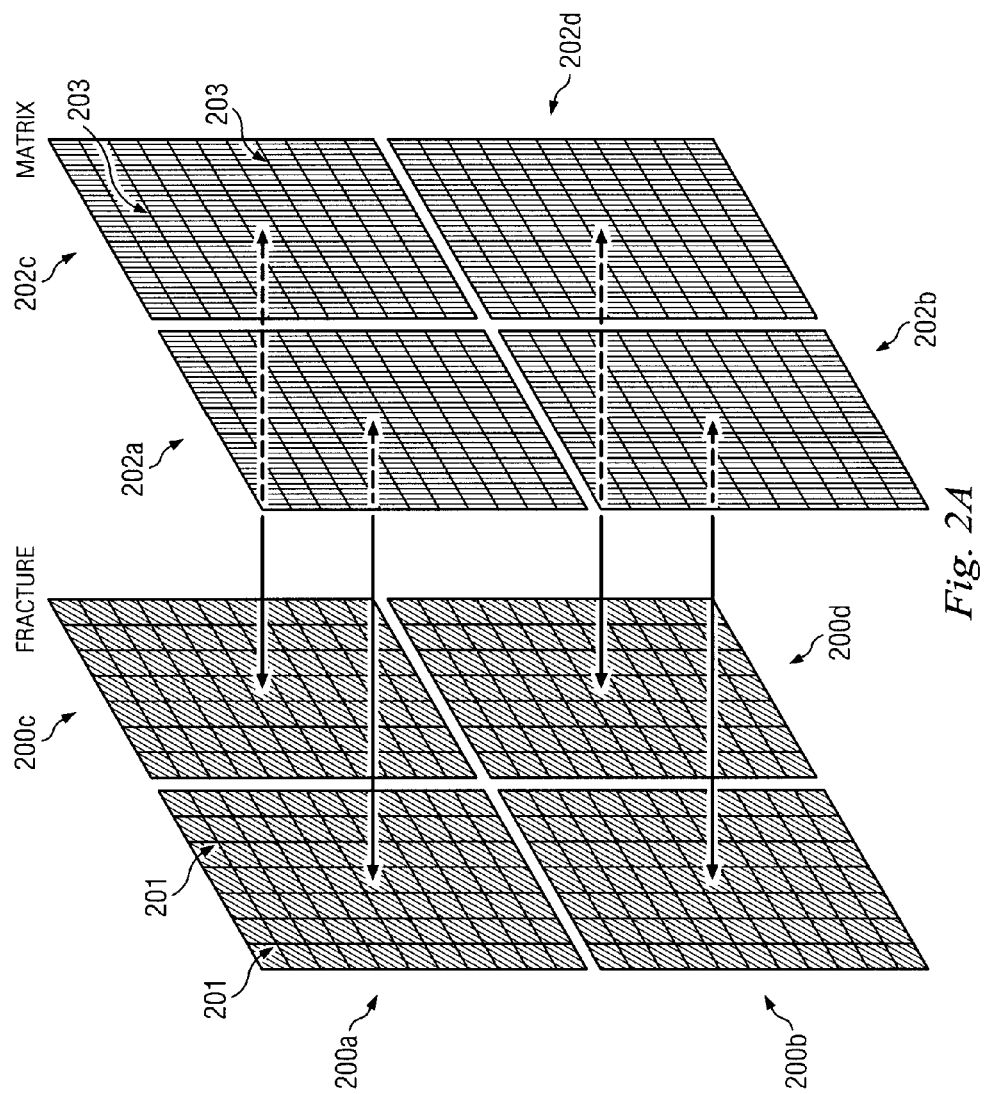
FIGS. 2A and 2B illustrate use of subgrids in implementing a reservoir simulation system of exemplary embodiments.
Figure 2B:
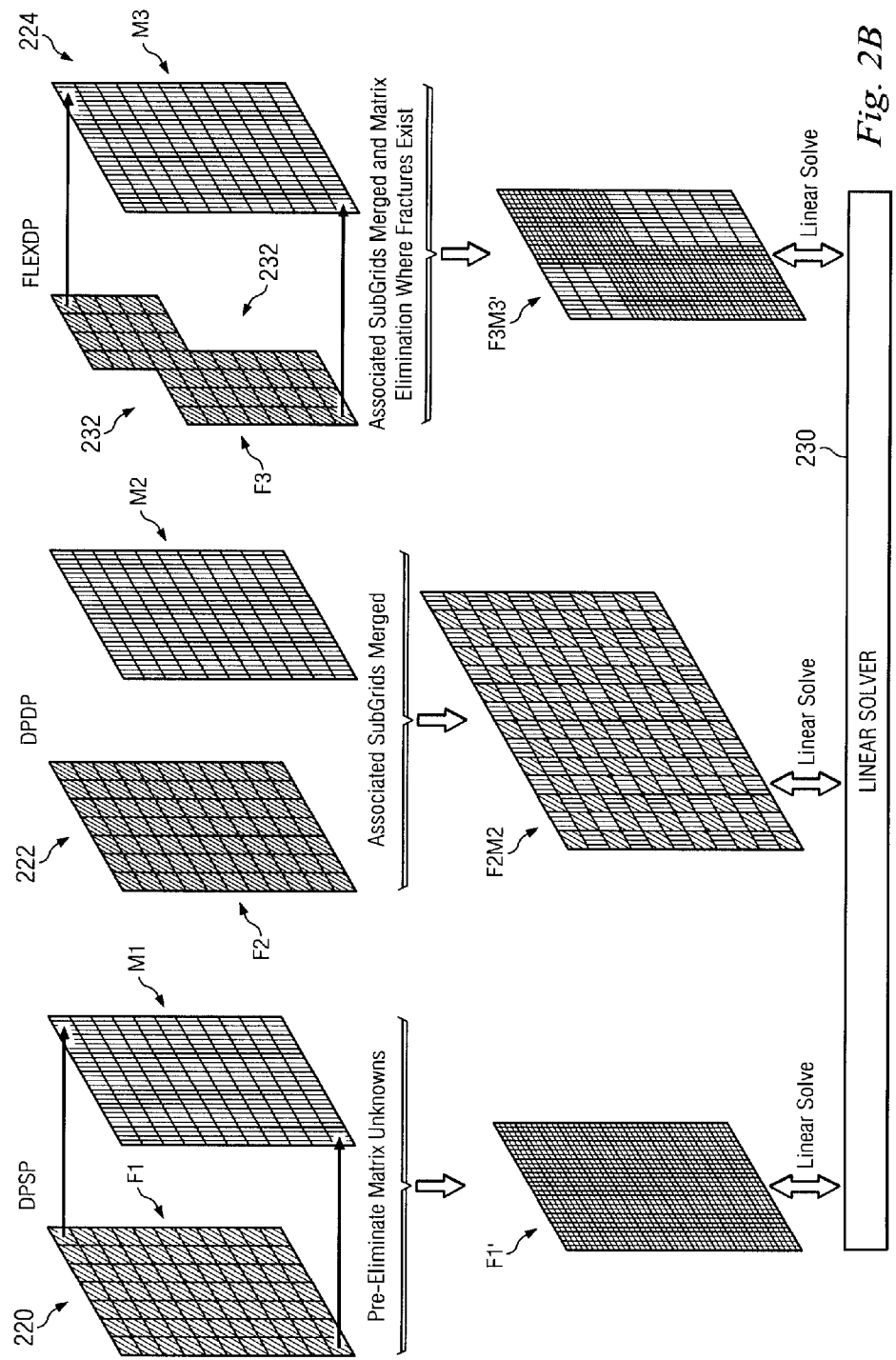

The above-described concepts are illustrated in FIGS. 2A and 2B. As shown in FIG. 2A, in one embodiment, a model of a domain of interest comprises two porosity types, namely a fracture porosity system (represented by fracture subgrids 200(a)-200(d), each comprising a plurality of fracture nodes, such as nodes 201) and a matrix porosity system (represented by matrix subgrids 202(a)-202(d), each comprising a plurality of matrix nodes, such as nodes 203). As previously indicated, subgrids representing the same physical location in a domain of interest, but having a different porosity type, are referred to as "associated." As illustrated in FIG. 2A, fracture subgrids 200(a)-200(d) are respectively associated with matrix subgrids 202(a)-202(d). As explained above, the classic multiporosity modes are DPSP and DPDP. In addition, a missing fracture (also referred to herein as "FlexDP") mode will also be referenced herein. As noted above, DPSP allows fracture-to-fracture transport and fracture-to-matrix transport between nodes, but not matrix-to-matrix transport between nodes. Thus, as illustrated in FIG. 2B and designated by a reference numeral 220, DPSP permits a relatively simple elimination of matrix unknowns prior to the formal linear solve, resulting in a modified fracture subgrid F1'. Specifically, in the case where matrix-to-fracture transport exists between two nodes, the matrix node (also called a "dual" matrix node) can be algebraically eliminated because of the structure of the equations, thereby simplifying the solve. Only matrix nodes with matrix-to-matrix transport are retained. The elimination of nodes simplifies the solution. The linear solve is performed on the modified fracture subgrid F1' (in which certain matrix nodes have been eliminated) by a linear solver 230 of the reservoir simulation system 110.

DPDP adds in matrix-to-matrix transport between matrix nodes and is therefore numerically more expensive because more unknowns must be processed in the linear solve. As a result, as illustrated in FIG. 2B and designated by a reference numeral 222, in the case of DPDP, a matrix subgrid M2 is merged with its associated fracture subgrid F2, resulting in a merged subgrid F2M2, which comprises the nodes of both subgrids F2 and M2. The linear solve is then performed on the merged subgrid F2M2 by the linear solver 230.

FlexDP addresses the instance in which fracture nodes are missing in some areas of a fracture subgrid. For example, as illustrated in FIG. 2B and designated by a reference numeral 224, in the FlexDP case, a matrix subgrid M3 has associated therewith a fracture subgrid F3. The fracture subgrid F3 has areas 232 in which fracture nodes are missing. Apart from the areas in which fracture nodes are missing, the FlexDP scenario is treated like DPSP (i.e., the matrix nodes lacking connectivity are eliminated). In the areas 232, connections between the matrix nodes are required for continuity. Connectivity between fracture free areas 232 and the other areas is maintained in two ways. In the first, continuity is preserved through special matrix-to-matrix connections. In the second, continuity is preserved through special fracture-to-matrix connections. The linear solve is then performed on a merged subgrid F3M3 by the linear solver 230.

The appropriate mode of operation (DPSP, DPDP, or FlexDP) is dictated by the physical properties of the porosity types in a domain being modeled. However, because porosity type can vary over the domain, the reservoir simulations system described herein permits simultaneous application of one or more of the modes.

As will be described in greater detail below, in one embodiment, the linear solver 230 has four basic functionalities, including (1) elimination of matrix nodes without connectivity to other matrix nodes, i.e., dual matrix nodes, from a matrix subgrid; (2) merging the remaining matrix nodes, namely non-dual matrix nodes, to fracture subgrids; (3) solving the resulting system using a regular linear solver; and (4) back-solving for the eliminated matrix nodes. Persons of ordinary skill in the art will appreciate that in the practice of the invention, pure DPSP or DPDP modes of operation are two extreme cases. The DPSP case does not require the merging functionality utilized in the DPDP case, while DPDP case does not require the elimination or back-solving functionalities utilized in the DPSP case. FlexDP is a general case in which both types of matrix node connectivities co-exist in a zone, i.e., a zone where some matrix nodes are connected to other matrix nodes as well as fracture nodes, and some matrix nodes are connected only to fracture nodes.

Dual Pore, Single Porosity Illustrations

Figure 3A:
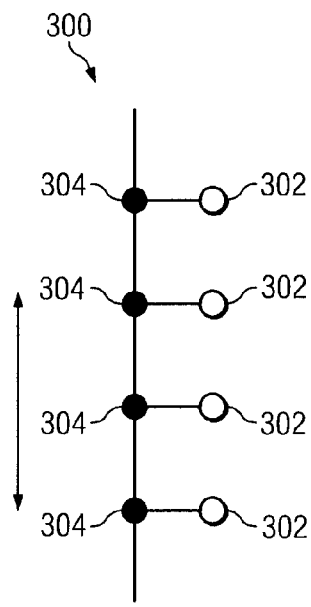
FIGS. 3A and 3B illustrate a one-dimensional DPSP model of a portion of a fractured reservoir implemented by a reservoir simulation system of exemplary embodiments.

Turning first to the case of DPSP, FIG. 3A illustrates a one-dimensional DPSP model 300 of a portion of a fractured reservoir in which there is a one-to-one correspondence between matrix nodes 302 and fracture nodes 304. As shown, no connectivity exists between the matrix nodes 302 depicted in FIG. 3A. Thus, matrix nodes 302 can each be characterized as a dual matrix node. Since the general rule in application of the invention is that matrix nodes without connectivity to other matrix nodes can be eliminated, in FIG. 3A, therefore, matrix nodes 302 would preferably be eliminated from a matrix node subgrid prior to application of the linear solve described herein.

Figure 3B:
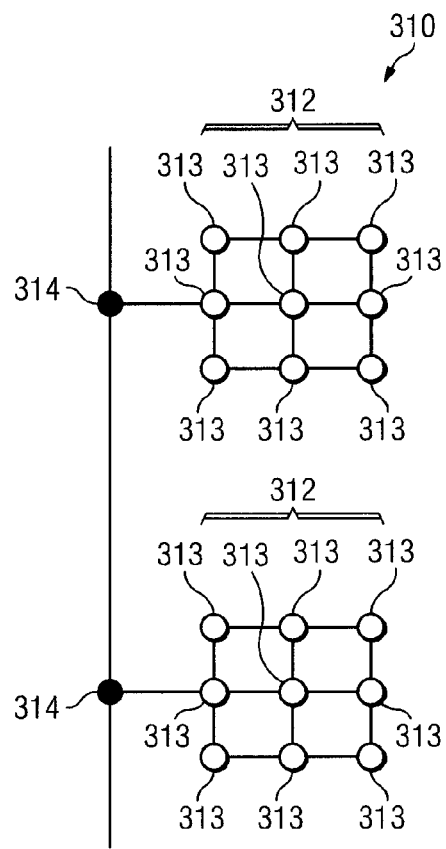

FIG. 3B illustrates a caveat to the general rule that matrix nodes with connectivity to other matrix nodes are retained in a linear solve. In the embodiment of the invention illustrated in FIG. 3B, a one-dimensional DPSP model of a portion of a fractured reservoir is illustrated, similar to the illustration of FIG. 3A. In FIG. 3B, fracture node 314 is similar the fracture node 304 of FIG. 3A. However, in FIG. 3B, the individual matrix nodes 302 shown in FIG. 3A are partitioned or subdivided into finer elemental representations than other nodes of the system. This technique, referred to as matrix subdivision, yields a plurality of matrix nodes 313. Each matrix node 313 is smaller in bulk volume than either the fracture node 314 to which it connects or other matrix nodes (such as 302 of FIG. 3A) of the model. The collection of matrix nodes 313 connected to any given fracture node 314 may be characterized as a matrix block 312. This allows the matrix to be resolved at a finer level than would be the case if matrix nodes and the fracture nodes to which they connect are of the same elemental bulk volume. Those persons of ordinary skill in the art will appreciate that a matrix block can be comprised of a single matrix node or multiple matrix nodes. If there is no matrix subdivision, then a matrix block and a matrix node are the same.

In a matrix block 312, the matrix nodes 313 may have connectivity to one another. However, in the illustrated embodiment, the overall matrix block 312 does not have connectivity to other matrix nodes (such as matrix nodes 302 of FIG. 3A) or other matrix blocks. Rather, a matrix block 312 only has connectivity to a fracture node 314. For this reason, for purposes of the linear solve, a matrix block can be treated as a dual matrix node, i.e., a matrix node without connectivity to any other matrix node, and thus eliminated prior to performance of the linear solve. In this regard, the matrix blocks as specified herein can be referred to as "dual" matrix blocks since the matrix blocks are only comprised of dual matrix nodes.

In any event, in application of the invention, matrix nodes (or matrix blocks) without connectivity to other matrix nodes (or matrix blocks) in a zone can be eliminated from a matrix subgrid, with some potential in-fills introduced between the fracture nodes. Those matrix nodes with connectivity to other matrix nodes, which may also be referred to as "virtual fracture nodes" since they are treated as fracture nodes in the linear solve, represent all other matrix nodes that satisfy one of the following conditions: (1) it does not have a fracture node associated therewith; (2) it is a dual matrix node that has at least one well perforation; or (3) there are an excessive number of interior nodes (i.e., nodes connected only to other matrix nodes, 312).

For DPSP models, the following assumptions are made in application of a linear solve:
1) A "matrix block" is comprised of one or more dual matrix nodes.
2) Matrix blocks communicate only with fracture nodes although matrix nodes within a block can communicate with each other;
3) A fracture node can be connected to multiple matrix nodes, although this is not usually the case.

The original linear system is partitioned to the form of equations as shows below, $$\begin{bmatrix} A_{mm} & A_{mf} \\ A_{fm} & A_{ff} \end{bmatrix} \begin{bmatrix} x_m \\ x_f \end{bmatrix} = \begin{bmatrix} r_m \\ r_f \end{bmatrix}$$

where the subscripts m and f refer respectively to matrix and fracture nodes.

With $A_{mm}$ eliminated, we have $$\tilde{A}_{ff} x_f = \tilde{r}_f \quad (1)$$

$$\tilde{A}_{ff} = A_{ff} - A_{fm} A_{mm}^{-1} A_{mf} \quad (2)$$

$$\tilde{r}_f = r_f - A_{fm} A_{mm}^{-1} r_m \quad (3)$$

Since $A_{mm}$ is a diagonal matrix, it is usually not expensive to be factored, $$A_{mm} = LU \quad (4)$$

The solution procedure is:

1. Update $\tilde{A}_{ff} = A_{ff} - A_{fm} U^{-1} L^{-1} r_{mf}$

2. Update $\tilde{r}_f = r_f - A_{fm} U^{-1} L^{-1} r_m$

3. Solve $\tilde{A}_{ff} x_f = \tilde{r}_f$

4. Update $\tilde{r}_m = r_m - A_{mf} x_f$

5. Solve $LU x_m = \tilde{r}_m$

Dual Pore, Dual Porosity Illustration

Figure 4:
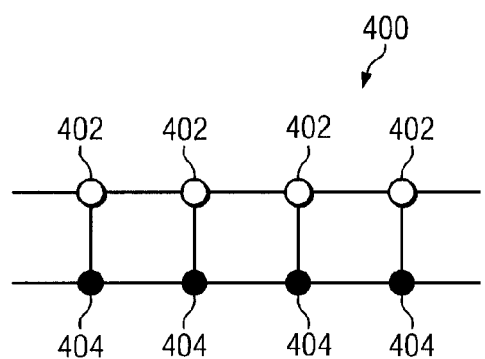
FIG. 4 illustrates a one-dimensional DPDP model of a portion of a fractured reservoir implemented by a reservoir simulation system of exemplary embodiments.

Turning now to the DPDP case, a one-dimensional DPDP model 400 of a fractured reservoir, as illustrated in FIG. 4, permits communications between matrix nodes 402 as well as between matrix nodes and fracture nodes 404. In contrast to DPSP, the matrix nodes 402 cannot be easily eliminated. Thus, matrix nodes 402 within matrix subgrids are merged to fracture subgrids. The result is a large grid (such as F2M2 shown in FIG. 2B). In the resultant grid, coefficient entries corresponding to the fracture nodes are preferably ordered first, followed by those coefficient entries corresponding to the matrix nodes. The reason for this order is because the mass transport between fracture nodes dominates and therefore the coefficient entries are much larger and they are more appropriate to be picked as the pivoting row in the factorization process.

Figure 5A:
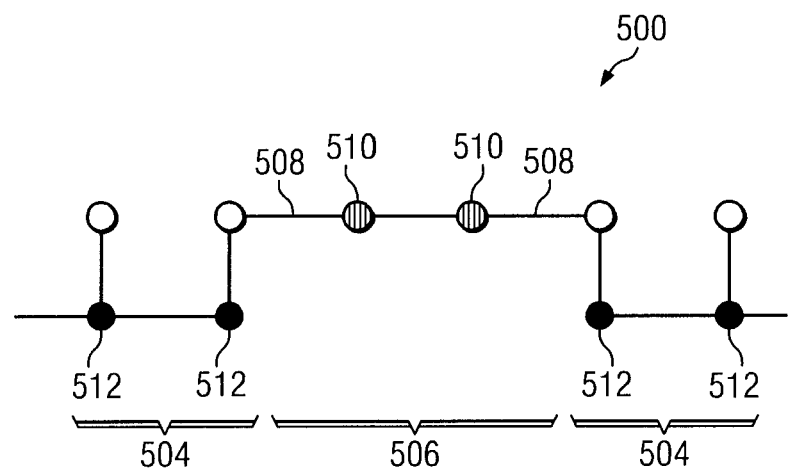
FIGS. 5A and 5B respectively illustrate approaches implemented by a reservoir simulation system of exemplary embodiments for handling a model having both fracture and fracture-free areas.
Figure 5B:
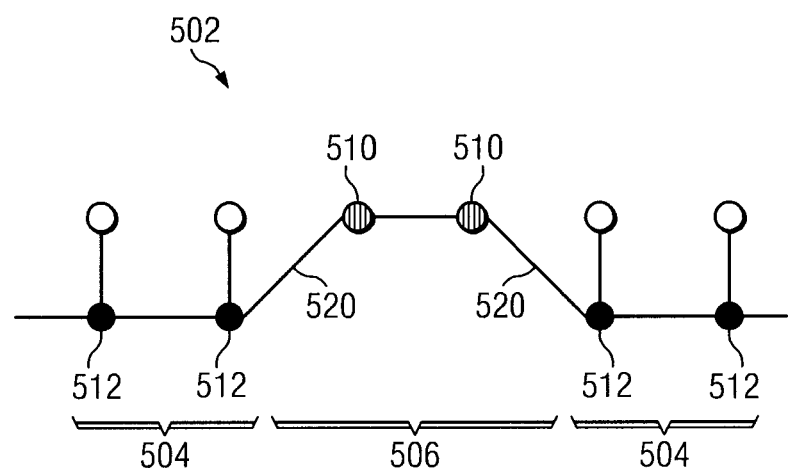

The FlexDP case is similar to the DPSP case (FIGS. 3A and 3B), except that fracture nodes are missing in some areas. There are two approaches, respectively illustrated in FIGS. 5A and 5B and designated by reference numerals 500 and 502, for addressing mass transfer between a fracture zone 504, and a fracture-free zone 506. As shown in FIG. 5A, in the first approach 500, the mass transfer between the zones 504 and 506 occurs through matrix-to-matrix connections, designated by reference numerals 508, and in particular, between the matrix nodes of the respective matrices. As previously noted, matrix nodes without associated fracture nodes, such as the nodes 510, are defined as "virtual fracture nodes." The virtual fracture nodes 510 are treated as fracture nodes in the model for purposes of the solution. After the matrix nodes are eliminated and the linear solver is applied, there are in-fills between fracture nodes 512 and the virtual fracture nodes 510. In the second approach 502, the mass transfer between the zones 504, 506, occurs through fracture-to-matrix connections 520. In this approach as well, matrix nodes without associated fracture nodes, such as the nodes 510 are defined as virtual fracture nodes. The treatment of the virtual fracture nodes 510 in the second approach 502 is identical to that of the first approach 500 and is even simpler since there are no in-fills (virtual fracture nodes 510 are connected directly to fracture nodes 512 without intermediary matrix nodes).

Figure 6:
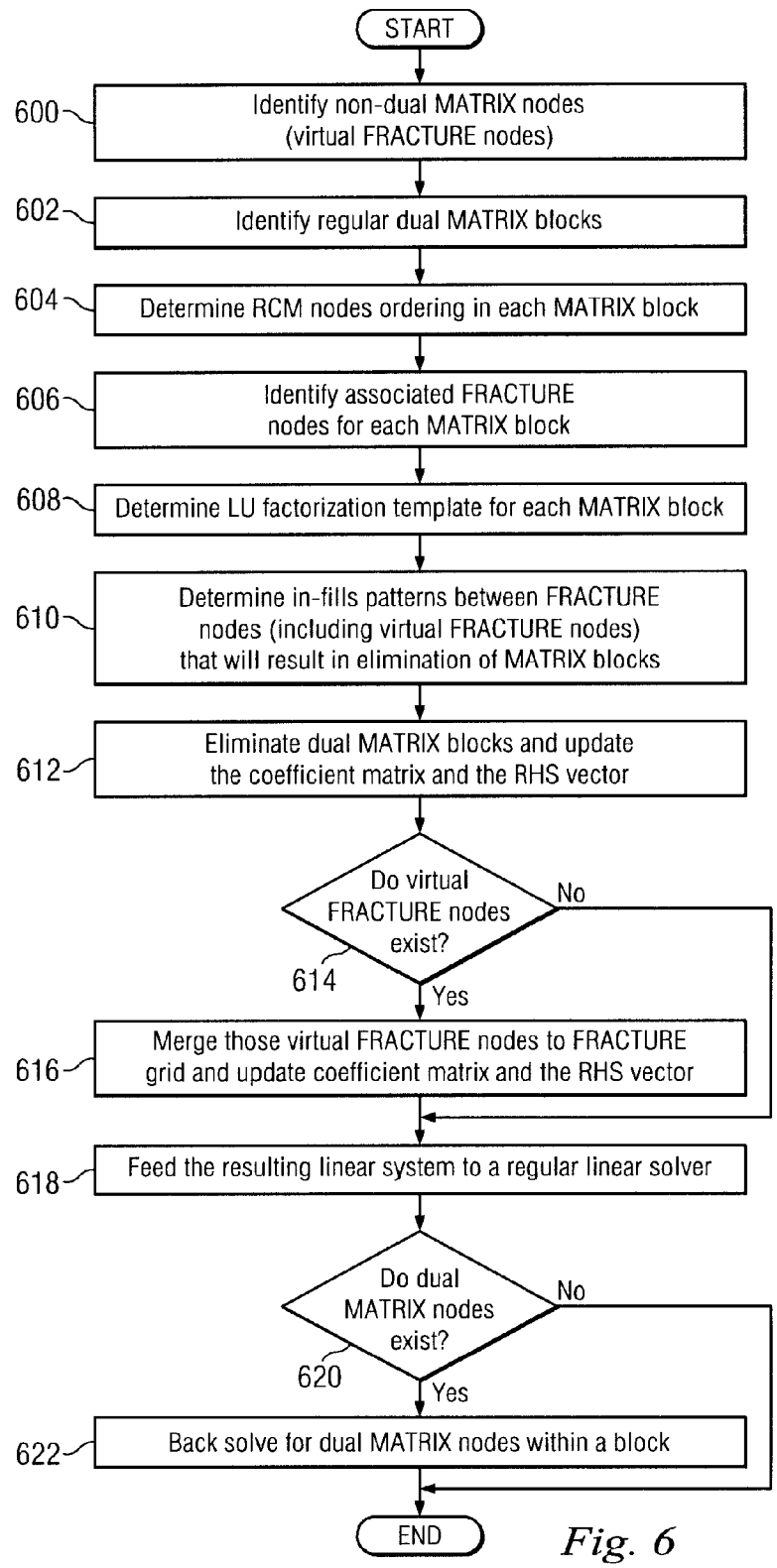
FIG. 6 illustrates a flowchart of the operation of a linear solver of a reservoir simulation system of exemplary embodiments.

FIG. 6 illustrates a flowchart of the operation of the linear solver 230 in accordance with one embodiment and in connection with a reservoir simulation or modeling techniques. In one embodiment, three dimensional modeling software may be utilized. In step 600, matrix nodes with connections to other matrix nodes (a.k.a., virtual fracture nodes or "non-dual" matrix nodes) are identified. In step 602, dual matrix nodes, i.e., matrix nodes without connections to other matrix nodes are identified as matrix blocks. A matrix block may be comprised of one or more dual matrix nodes. Such matrix blocks may also be referred to as dual matrix blocks. In any event, at step 604, the Reverse Cuthill McKee ("RCM") ordering of the matrix nodes for each matrix block is determined. In step 606, associated fracture nodes are identified for each matrix block. In step 608, a lower upper ("LU") factorization template is determined for each matrix block. In step 610, in-fill patterns between fracture nodes (including virtual fracture nodes) that will result from the elimination of dual matrix blocks (or nodes as the case may be) are determined. In step 612, dual matrix blocks (or nodes, as the case may be) are eliminated for purposes of the solve and the coefficient matrix and Right Hand Side ("RHS") vector are updated. In step 614, a determination is made whether virtual fracture nodes exist. If such virtual fracture nodes exist, execution proceeds to step 616, in which the virtual fracture nodes are merged to the fracture subgrid and the coefficient matrix and RHS vector are updated accordingly, after which execution proceeds to step 618. If in step 614, it is determined that no virtual fracture nodes exist, execution proceeds directly to step 618.

In step 618, the resulting linear system is fed to a regular linear solver. In step 620, a determination is made whether dual matrix nodes existed prior to elimination. If so, execution proceeds to step 622, in which back-solving is performed for any eliminated matrix nodes comprising a matrix block, after which execution terminates in step 624. If a negative determination is made in step 620, execution terminates in step 624.

Figure 7:
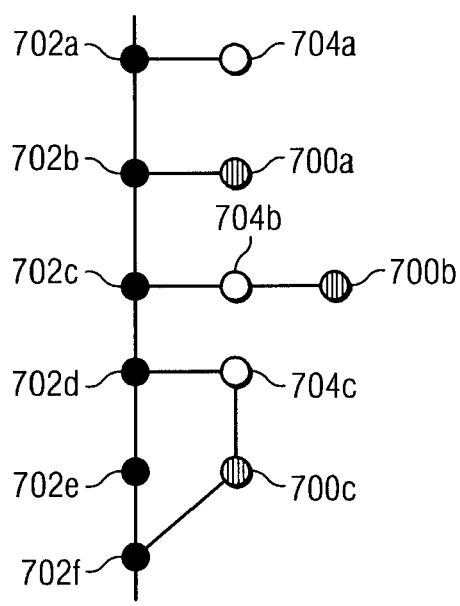
FIG. 7 is a one-dimensional triple porosity model of a portion of a fractured reservoir implemented by a reservoir simulation system of exemplary embodiments.

In some embodiments, higher-order porosities, such as vugs, are supported and modeled by characterizing vugs with vug nodes. In one such embodiment, matrix nodes and fracture nodes have the same properties as in the DPSP case, while vug nodes communicate with both matrix nodes and fracture nodes, but not with other vug nodes. In FIG. 7, vug nodes 700a-700c are illustrated in relation to fracture nodes 702a-702f and matrix nodes 704a-704c. A vug node 700a may connect only to a fracture node 702b, or a vug node 700b may connect only to a matrix node 704b of a vug node 700c may connect to both a matrix node 704c and a fracture node 702f. A vug node connected only to a fracture node, such as vug node 700a, will be pre-eliminated in the same way as a matrix node connected to only a fracture node is pre-eliminated in a DPSP model. A vug node connected only to one or more matrix nodes, such as the node 700b, is merged to the matrix node 704b and become part of the matrix subgrid, at which point the appropriate matrix nodes are eliminated like in a DPSP system. A vug node 700c connected to both a fracture node 702f and a matrix node 704c is merged to its associated matrix subgrid, and, possible in-fills are introduced for the fracture nodes connecting to the matrix nodes and the vug nodes belonging to that matrix subgrid, after which appropriate matrix nodes are then eliminated.

In FIG. 7, much in the same way that subdivided matrix nodes 313 of FIG. 3B formed a matrix block 312, vug nodes connected to matrix nodes can be characterized as a block and treated accordingly. Thus, in FIG. 7, vug node 700b and matrix node 704b may be treated as a block. Likewise, vug node 700c and matrix node 704c may be treated as a block. In this regard, if a determination is made that a vug node is connected to at least one matrix node and to at least one fracture nodes, the vug node can be merged with the matrix node(s) to form a dual matrix block, and thereafter in-fills for fracture nodes associated with the block can be introduced.

In an alternative embodiment, shown in FIG. 7, a fracture node can be connected to multiple matrix nodes or a block comprised of multiple matrix nodes.

The foregoing methods and systems described herein are particularly useful in drilling wellbores in oil and gas reservoirs. Following reservoir modeling as described herein, a drilling plan may be implemented based on the modeling. The plan includes drilling of a wellbore into a reservoir having fracture and fracture free zones modeled using the method and system of the invention. Those of ordinary skilled in the art will appreciate that while the method of the invention has been described statically as part of implementation of a drilling plan, the method can also be implemented dynamically. Thus, a drilling plan may be implemented and data from the drilling process may be used to update the model. After implementing the drilling plan, the system of the invention may be utilized during the drilling process on the fly or iteratively to calculate and re-calculate connectivity characteristics of the reservoir over a period of time as parameters change or are clarified or adjusted. In either case, the results of the dynamic calculations may be utilized to alter a previously implemented drilling plan. For example, the dynamic calculations may result in the utilization of a heavier or lighter drilling fluids or a change in the direction of a wellbore. As described herein, one embodiment is a method for performing simulation of a reservoir represented by a model having a plurality of matrix nodes, a plurality of fracture nodes, a fracture zone and a fracture-free zone. The method comprises the computer-implemented steps of, for each of a plurality of matrix nodes comprising interconnected zones, characterizing the matrix nodes; for each block comprised of one or more dual matrix nodes, eliminating the block and updating a coefficient matrix and RHS vector for the model accordingly; and, determining in-fill patterns between fracture nodes, including virtual fracture nodes, that will result from the elimination. In certain embodiments, the method further comprises, for any virtual fracture nodes, i.e., non-dual matrix nodes, that may exist in the model, merging the virtual fracture nodes to a fracture grid and updating the coefficient matrix and RHS vector for the model accordingly; solving the resultant linear system using a linear solver; and backsolving for the eliminated dual matrix nodes. In some embodiments, certain matrix nodes may be subdivided into a plurality of matrix nodes with smaller bulk volumes than the original matrix node or any nodes to which it connects, thereby forming a matrix block. Thereafter, depending on its connectivity characteristics, the matrix block may be treated as a dual matrix node and eliminated.

Another embodiment is a system for performing simulation of a reservoir represented by a model having a plurality of matrix nodes, a plurality of fracture nodes, a fracture zone and a fracture-free zone. The system comprises a processor; storage media; means for characterizing interconnected zones comprised of a plurality of matrix nodes; means for eliminating blocks comprised of one or more dual matrix nodes which are identified in the characterization; and means for updating a coefficient matrix and RHS vector for the model accordingly. The system further comprises means for determining in-fill patterns between fracture nodes, including virtual fracture nodes; means for merging the virtual fracture nodes to a fracture grid and updating the coefficient matrix and RHS vector for the model accordingly; means for solving the resultant linear system using a linear solver; and means for backsolving for the eliminated dual matrix nodes.

Yet another embodiment of the invention is a method for performing simulation of a reservoir represented by a model having a plurality of matrix nodes. The method characterizes matrix nodes as dual matrix nodes or non-dual matrix nodes for any nodes that comprise interconnected fracture zones and fracture free zones. To the extent one or more dual matrix nodes exist, the are grouped as a block and eliminated, after which a coefficient matrix and RHS vector for the model are updated accordingly. If any non-dual matrix nodes exist, the non-dual matrix nodes—also called "virtual" fracture nodes—are merged to a fracture grid. Finally, a linear solver is used to solve the resultant linear system. In some embodiments, if any dual matrix nodes were eliminated, backsolving for the eliminated dual matrix nodes is performed. Where mass transfer between the fracture zone and the fracture-free zone occurs via matrix-to-matrix connections, a plurality of non-dual matrix nodes are identified. Where mass transfer between the fracture zone and the fracture-free zone occurs via fracture-to-matrix connections, a plurality of dual matrix nodes are identified. In certain embodiments, virtual fracture nodes in the zones may be treated as fracture nodes and in-fill patterns between fracture nodes, including virtual fracture nodes, may be determined prior to elimination of any dual matrix nodes. These virtual fracture node may be merged to a fracture grid and thereafter, the coefficient matrix and RHS vector for the model can be updated accordingly. In certain embodiments, a Reverse Cuthill McKee ("RCM") ordering of matrix nodes for each block may be performed, and thereafter, fracture nodes associated with matrix nodes are identified and an LU factorization template for each of the blocks can be determined.

While certain features and embodiments of the invention have been described in detail herein, it will be readily understood that the invention encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of describing the invention.

For example, although the reservoir simulation system has been described with reference to certain types of porosities (e.g., matrix, fracture, and vug), it will be recognized that other types of porosities may be advantageously modeled using the principles described herein. Additionally, higher-order porosity models may also be solved using the principles described herein.

It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method for performing simulation of a reservoir represented by a model having a plurality of matrix nodes, a plurality of fracture nodes, at least one fracture zone and at least one fracture-free zone, the method comprising computer-implemented steps of:

for each of a plurality of matrix nodes comprising interconnected zones, characterizing the matrix nodes, wherein the matrix nodes represent a pore system characterized by high pore volume and low conductivity;

for a block comprised of one or more dual matrix nodes, eliminating the block and updating a coefficient matrix and Right Hand Side ("RHS") vector for the model accordingly, wherein the dual matrix nodes represent matrix nodes with matrix-to-fracture connectivity;

determining in-fill patterns between fracture nodes, including virtual fracture nodes, that will result from the elimination, wherein the fracture nodes represent a pore system characterized by low pore volume and high conductivity and the virtual fracture nodes represent fracture nodes with matrix-to-matrix connectivity;

for one or more virtual fracture nodes, merging the virtual fracture nodes to a fracture grid and updating the coefficient matrix and RHS vector for the model accordingly;

solving the resultant linear system using a linear solver;

backsolving for the eliminated dual matrix nodes, thereby simulating the reservoir; and implementing a drilling plan for utilizing during a drilling process based upon the reservoir simulation.

2. The method of claim 1 wherein mass transfer between the fracture zone and the fracture-free zone is defined to occur via matrix-to-matrix connections.

3. The method of claim 1 wherein mass transfer between the fracture zone and the fracture-free zone is defined to occur via fracture-to-matrix connections.

4. The method of claim 1 wherein characterizing the matrix nodes comprises determining a Reverse Cuthill McKee ("RCM") ordering of the matrix nodes of a block.

5. The method of claim 1 wherein characterizing the matrix node comprises identifying fracture nodes associated with the matrix node.

6. The method of claim 1 wherein characterizing the matrix node comprises determining a lower upper ("LU") factorization template for a matrix block.

7. The method of claim 1 wherein the reservoir model comprises vug nodes, the method further comprising computer-implemented step of:

prior to characterizing, responsive to a determination that one of the vug nodes is associated with at least one of the matrix nodes, merging the associated one of the vug nodes with the at least one of the matrix nodes to form a block.

8. The method of claim 1 wherein the reservoir model comprises vug nodes, the method further comprising computer-implemented step of:

identifying one or more vug nodes and a connection for each of said identified vug nodes; responsive to a determination that one of the vug nodes is associated with at least one of the matrix nodes and to at least one of the fracture nodes:

merging the associated one of the vug nodes with the at least one of the matrix nodes to form a dual matrix block; and introducing in-fills for fracture nodes associated with the block.

9. The method of claim 1, further comprising the step of subdividing a matrix node into a plurality of matrix nodes to form a matrix block, wherein the plurality of matrix nodes have smaller bulk volumes than any node to which the matrix node connects.

10. The method of claim 9, wherein the matrix block is treated as a matrix node.

11. The method of claim 9, wherein the matrix block is characterized as a dual matrix node.

12. A system for performing simulation of a reservoir represented by a model having a plurality of matrix nodes, a plurality of fracture nodes, a fracture zone and a fracture-free zone, the system comprising:

a processor;
storage media;
means for characterizing interconnected zones comprised of a plurality of matrix nodes, wherein the matrix nodes represent a pore system characterized by high pore volume and low conductivity;

means for eliminating a block comprised of one or more dual matrix nodes for at least one of the zones, and updating a coefficient matrix and Right Hand Side ("RHS") vector for the model accordingly, wherein the dual matrix nodes represent matrix nodes with matrix-to-fracture connectivity;

means for determining in-fill patterns between fracture nodes, including virtual fracture nodes, that will result from the elimination, wherein the fracture nodes represent a pore system characterized by low pore volume and high conductivity and the virtual fracture nodes represent fracture nodes with matrix-to-matrix connectivity;

means for merging the virtual fracture nodes to a fracture grid and updating the coefficient matrix and RHS vector for the model accordingly;

means for solving the resultant linear system using a linear solver;

means for backsolving for the eliminated dual matrix nodes, thereby simulating the reservoir; and means for implementing a drilling plan for utilizing during a drilling process based upon the reservoir simulation.

13. The system of claim 12 wherein mass transfer between the fracture zone and the fracture-free zone is defined to occur via matrix-to-matrix connections.

14. The system of claim 12 wherein mass transfer between the fracture zone and the fracture-free zone is defined to occur via fracture-to-matrix connections.

15. The system of claim 12 wherein characterizing the matrix nodes comprises:

determining a Reverse Cuthill McKee ("RCM") ordering of the nodes of a matrix block;

identifying fracture nodes associated with the matrix block; and determining a lower upper ("LU") factorization template for the matrix block.

16. The system of claim 12 wherein the reservoir model comprises vug nodes, the system further comprising, responsive to a determination that one of the vug nodes is associated with only matrix nodes, means for merging the associated one of the vug nodes with at least one of the matrix nodes to form a dual matrix block.

17. The system of claim 12 wherein the reservoir model comprises vug nodes, the system further comprising, responsive to a determination that one of the vug nodes is associated with both a matrix node and a fracture node:

means for merging the associated one of the vug nodes with the at least one matrix node to form a non-dual matrix node; and means for introducing in-fills for the at least one fracture node connected to the non-dual matrix node formed of at least one matrix node and the associated one of the vug nodes.

18. A computer program product comprising non-transitory computer-readable medium having stored thereon instructions executable by a computer for causing the computer perform simulation of a reservoir represented by a model having a plurality of matrix nodes and a plurality of fracture nodes and a fracture zone and a fracture-free zone, the instructions for causing the computer to:

for each of the plurality of matrix nodes comprising interconnected zones, characterizing the matrix nodes as dual matrix nodes or non-dual matrix nodes, wherein the matrix nodes represent a pore system characterized by high pore volume and low conductivity, the dual matrix nodes represent matrix nodes with matrix-to-fracture connectivity, and the non-dual matrix nodes represent matrix nodes with matrix-to-matrix connectivity;

for each block comprised of one or more dual matrix nodes, eliminating the block and updating a coefficient matrix and Right Hand Side ("RHS") vector for the model accordingly;

if any non-dual matrix nodes exist, merging non-dual matrix nodes to a fracture grid;

solving the resultant linear system using a linear solver;

for the dual matrix nodes which were eliminated, backsolving for the eliminated dual matrix nodes, thereby simulating the reservoir; and implementing a drilling plan for utilizing during a drilling process based upon the reservoir simulation.

19. The computer program product of claim 18 wherein mass transfer between the fracture zone and the fracture-free zone is defined to occur via matrix-to-matrix connections so as to result in a plurality of non-dual matrix nodes.

20. The computer program product of claim 18 wherein mass transfer between the fracture zone and the fracture-free zone is defined to occur via fracture-to-matrix connections so as to result in a plurality of dual matrix nodes.

21. The computer program product of claim 18, further comprising:

characterizing one or more non-dual matrix nodes as virtual fracture nodes in the zones;

determining in-fill patterns between fracture nodes, including virtual fracture nodes, that will result from the elimination step;

merging one or more virtual fracture nodes to a fracture grid and updating the coefficient matrix and RHS vector for the model accordingly;

determining a Reverse Cuthill McKee ("RCM") ordering of the matrix nodes of a block;

identify fracture nodes associated with a matrix node; and determine a lower upper ("LU") factorization template for a matrix block.

22. The computer program product of claim 18 wherein the reservoir model includes a plurality of vug nodes, the method further comprising:

identifying at least one vug node associated with at least one matrix node; and merging at least one of the vug nodes with at least one of the matrix nodes to form a dual matrix node.

23. The computer program product of claim 18 wherein the reservoir model includes a plurality of vug nodes, the method further comprising:

identifying at least one vug node associated with at least one matrix node and at least one fracture node;

merging at least one of the vug nodes with its associated matrix node to form a dual matrix block; and introduce in-fills for the at least one fracture nodes connected to the block.

24. A method for drilling a wellbore in reservoir, which method comprises:

modeling an oil and gas reservoir having interconnected fracture zones and fracture free zones, matrix nodes and fracture nodes, the step of modeling comprising:

characterizing the matrix nodes as dual matrix nodes or non-dual matrix nodes, wherein the matrix nodes represent a pore system characterized by high pore volume and low conductivity, the dual matrix nodes represent matrix nodes with matrix-to-fracture connectivity, and the non-dual matrix nodes represent matrix nodes with matrix-to-matrix connectivity;

for each block comprised of one or more dual matrix nodes, eliminating the block and updating a coefficient matrix and Right Hand Side ("RHS") vector for the model accordingly;

merging the non-dual matrix nodes to a fracture grid;

utilizing a linear solver to solve the resultant linear system; and backsolving for any eliminated dual matrix nodes;

preparing equipment to construct a portion of said wellbore;

based on the modeled reservoir, selecting a trajectory for the wellbore; and drilling a wellbore in accordance with the selected trajectory.

25. The method of claim 24, further comprising identifying a plurality of non-dual matrix nodes where mass transfer between the fracture zone and the fracture-free zone occurs via matrix-to-matrix connections.

26. The method of claim 24, further comprising identifying a plurality of dual matrix nodes where mass transfer between the fracture zone and the fracture-free zone occurs via fracture-to-matrix connections.

27. The method of claim 24, further comprising characterizing one or more non-dual matrix nodes as virtual fracture nodes in the zones and determining in-fill patterns between fracture nodes, including virtual fracture nodes, that will result from the elimination.

28. The method of claim 27, further comprising merging the virtual fracture nodes to a fracture grid and thereafter, updating the coefficient matrix and RHS vector for the model accordingly.

29. The method of claim 24, further comprising performing Reverse Cuthill McKee ("RCM") ordering of the matrix nodes for each block comprised of a plurality of matrix nodes, and thereafter, identifying fracture nodes associated with matrix nodes and determining a lower upper ("LU") factorization template for each of the matrix blocks.

* * * * *